May 17, 1932.   J. P. REMINGTON   1,859,245
DIFFERENTIAL MECHANISM
Filed Oct. 2, 1930
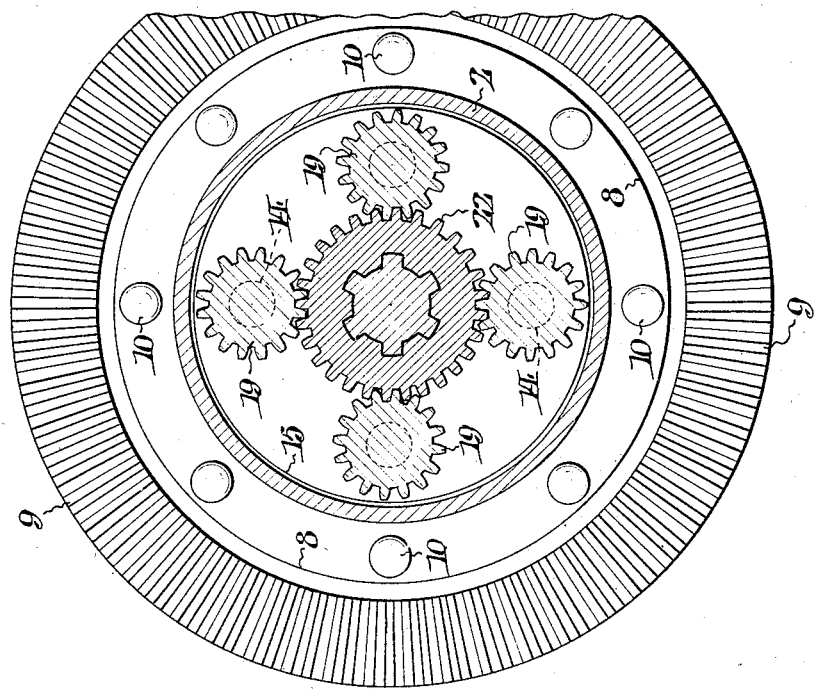
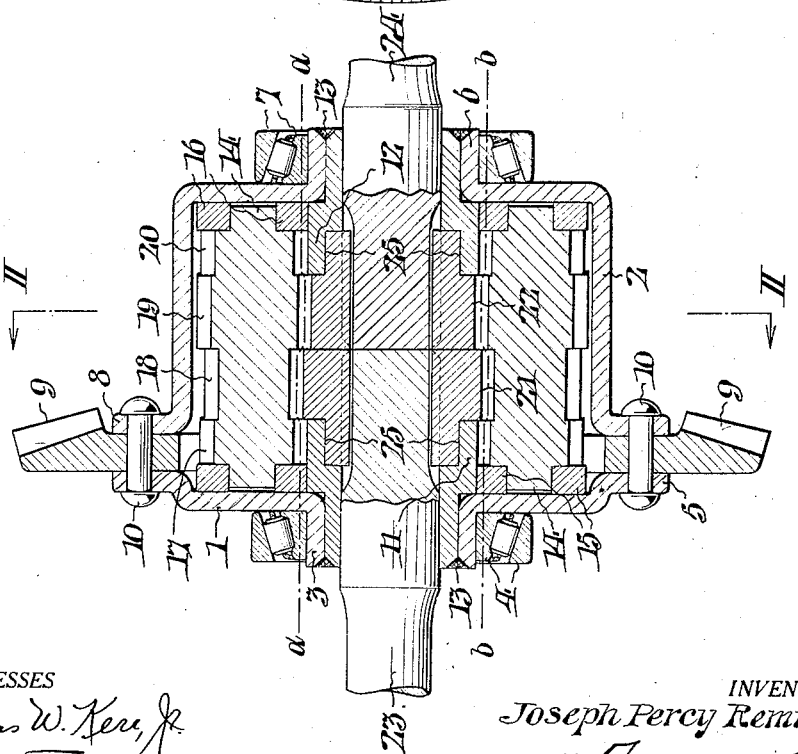
WITNESSES
Thomas W. Kerr, Jr.
Hubert Fuchs
INVENTOR:
Joseph Percy Remington,
BY Fraley Paul
ATTORNEYS.

Patented May 17, 1932

1,859,245

UNITED STATES PATENT OFFICE

JOSEPH PERCY REMINGTON, OF PHILADELPHIA, PENNSYLVANIA, ASSIGNOR TO JAMES H. BELL, OF PHILADELPHIA, PENNSYLVANIA

DIFFERENTIAL MECHANISM

Application filed October 2, 1930. Serial No. 485,868.

This invention in its broader aspects relates to mechanism for controlling various predetermined velocity ratios between a driving and driven members.

More particularly, the present improvements have reference to a differential adapted for automotive usage and the like, wherein it is desirable that the driven component shall always function as a practically solid one-piece axle or shaft excepting when the associated wheels are simultaneously rotated in reverse directions by forces exerted thereagainst, such as the resistive road contacts set up during curvilinear driving. The noted function in "differentials" for automotive purposes is expedient to eliminate free wheel spinning commonly characteristic of known conventional automobile differentials, where there always exists a constant loss in tractive power due to wheel slippage, with a total loss of all propulsive effort when the "critical" point in the co-efficient of friction between one wheel tire and the road surface is encountered.

Another disadvantageous feature of the known bevel or spur gear differentials arises from the power being applied to the axis of the spider or satellite gears. Again, as the length of the lever arm in the conventional bevel or spur gear differentials must be half the diameter of the gear, which in most cases is at least one-half inch; such types are very efficient in differentiation but conversely inefficient in propulsive effort whenever wheel slippage occurs, since said propulsive effort is dependent solely on the relative co-efficients of friction of the wheel tires which varies widely due to differing road surface conditions.

It is, therefore, obviously desirable to increase the available propulsive force and decrease the tendency toward differential action by employing gearing in which the power for differentiation is applied through shorter and more direct leverages. Thus by employing a short leverage in a gear train differential action can be obtained and the feature of a non-slipping drive provided without employing any ratchet or overrunning mechanism, or devices dependent on locking or friction elements.

A primary object of this invention, accordingly, is to furnish a simple, durable and compact differential mechanism, for automotive usage more particularly, although not so essentially, in which the friction between the wheel tires and the road surfaces will play no part in "differentiating", but wherein the difference in distance traveled by the respective driven wheels shall determine the differential movement.

Another object is to provide a differential structure including an inertia element which shall function as a stabilizer to prevent too free and sudden a change in the differential action.

Other objects are to provide a differential mechanism in which full and equal torque is applied, as directly as possible, to each axle component during straight-ahead or reverse driving, with greater tractive effort "immediately" applied to the inside wheel in acceleration on curves; to provide that neither wheel shall be, at any time, without entire available tractive effort; and one in which "skidding" is eliminated.

With the foregoing and other objects coincidentally obtained, my invention comprehends certain novel uses of gearing for differential purposes in which power from the prime mover is applied to all the entrained gears, on approximately their pitch lines, instead of to the axis of any particular gear or gears in said train.

In order that the novel features of this invention may be clearly appreciated and its characteristic distinctions understood I will now describe a practical embodiment thereof chosen for illustration herein as a typical example. However, it is to be understood that I do not restrict myself to such disclosure but include herein all such variations in structure that may be reasonably circumscribed by the scope of the subjoined claims.

In the drawings:

Fig. I is a longitudinal section through a differential, for automotive purposes, embodying the present improvements; and, Fig. II is a section taken approximately as indicated by the arrows II—II in Fig. I.

Referring more in detail to the drawings, my improved differential comprises a case including housing sections respectively designated 1 and 2; both conveniently, although not essentially, formed from pressed steel. The section or member 1, it will be seen is provided with a boss 3 for reception of the usual roller bearing 4, and an offset flange 5; while the member 2 is of cylindric formation with a boss 6, roller bearing 7, and a flange 8, between which and the flange 5 aforesaid I securely mount the usual ring gear 9; said parts being rigidly connected together by appropriate means such as bolts or rivets 10. The bosses 3, 6 serve for mounting the differential case 1, 2 in the conventional face plate bolted to the rear axle housing of automobiles.

A spur gear 11 is pressed into the boss 3 of the case section 1, and a complemental spur gear 12 is similarly secured in the boss 6 of the cylindric section 2; both of said gears being permanently attached in position to their respective bosses, for example, by welding, as conventionally indicated at 13.

Two or more jack shafts 14, four being shown, are supported at their ends in ring bearings 15, 16 which are, in turn, mounted on non-toothed portions of the spur gears 11, 12, as clearly understandable from Fig. I. Each of the jack shafts is formed with, or has securely attached thereon, a sequence of gears, 17, 18, 19 and 20, for purposes later on explained.

These jack shafts 14, associated gears 17—20, and the ring bearings 15 thus constitute a cage unit having capacity for rotation around the spur gears 11, 12, and intermediate gears 21, 22 for purposes of differentiation as hereinafter set forth.

The two outside jack shaft gears 17, 20 are of corresponding diameter and mesh with the gears 11, 12; while the latter may, conveniently be twice the diameter of the former. The two inner jack shaft gears 18, 19 are of different diameter and mesh with the intermediate gears 21, 22 aforesaid, of appropriately differing pitch diameters; said latter gears being splined on the abutting shaft or axle ends 23, 24, respectively; while afforded journal bearing in the counter-bored inner ends 25 of the gears 11, 12.

To clarify the characteristics of a differential gear train, as above set forth, a certain ratio must be assumed which can, obviously, be varied to meet different service requirements. Assume, for example, that ten (10) pitch spur gears of the following pitch diameters are used: the outside jack shaft gears 17, 20 having fifteen (15) teeth and a pitch diameter of one-and-a-half inches (1.5″), mesh with the gears 11, 12, each having thirty (30) teeth of a three-inch (3″) pitch diameter. The inner jack shaft gears 18, 19, respectively, have fourteen (14) teeth with a pitch diameter of one-point-four (1.4″) inches and sixteen (16) teeth with a one-point-six (1.6″) pitch diameter. These latter gears coact with the intermediate gears 21, 22, respectively, having thirty-one (31) teeth with a three-point-one (3.1″) inch pitch diameter and twenty-nine (29) teeth with a two-point-nine (2.9″) inch pitch diameter. Six (6) or eight (8) pitch gearing would, obviously, be more preferable in practice, but ten (10) pitch serves conveniently as an example.

Now, it will be remarked that the explained construction resembles in general appearance a novel spur gear type differential in which only one-half the number of jack shafts 14 are necessary, and more especially said jack shafts are not driven by bearings in the differential case 1, 2, but by gears 11, 12 attached to said case. Hence all rotative force delivered to the axle ends 23, 24 is therefore applied along the pitch lines $a$, $a$ and $b$, $b$ indicated in Fig. I; while the only available differential force is represented by the divergence of said lines from the straight. This furnishes a very direct application of power for "straight-ahead" or "reverse" driving, almost as though the gears were all keyed together; and a differential tendency for culvilinear driving which may be as desired by selection of the proper ratio for the gears 21, 22, and 18, 19.

It will, furthermore, be readily understood that if one wheel of a car fitted with my novel differential be jacked up and power applied to drive said car, the axle 23, 24 would act as a solid one-piece shaft and move the car, since the leverage is represented by the difference in pitch diameter between one axle gear 21 for example, and the two case gears 11, 12, is only one tooth or one-tenth of an inch (1/10″) on the ten (10) pitch ratio above set forth. On the other hand, when both wheels are simultaneously and oppositely rotated the available leverage represented by the difference between the two axle gears 21, 22 is twice as great namely two (2) teeth or two-tenths of an inch (2/10″), which in practice has proven ample for curvilinear driving.

With the ratio above given the cage formed by the parts 14, 15 and 16, will rotate five (5) times for the complete revolution of one vehicle wheel, rotating clockwise as viewed in Fig. II, when the curve traveled is to the right; and counter-clockwise when said curve is to the left. This does not involve excessive speeds even under maximum speed conditions, since one wheel travels only three (3) to four (4) times around, depending on the tire size, to each lap on a track; no matter what the car speed may be. This, consequently, means fifteen (15) to twenty (20) revolutions per minute approximately for the cage; or, a linear speed on the pitch line a, a, b, b, of the gears of less than one-tenth (1/10) the usual linear speed of ring gear and pinion drives. The cage 14, 15 and 16, however, possesses a certain inertia immediately available as increased torque on the inside wheel in acceleration on curves and exercises a very noticeable stabilizing effect under conditions involving danger of losing control of the car.

From the foregoing it is thought the merits and advantages inhering to my novel type of differential mechanism will be clearly appreciated; and while I have explained one practical form thereof with some particularity, it is to be distinctly understood that I reserve the right to make all such reasonable modifications not in conflict with the prior art, and as fairly fall within the scope of the following claims.

Having thus described my invention, what I claim is:—

1. In differential mechanism for transmitting power at equal or varying speed to two co-axial aligned shaft sections comprising a rotatable gear case enclosing differentially toothed driven gears of slightly differing pitch diameters attached to said shaft sections, equally toothed driving gears rigidly secured co-axially in said case and affording journal bearing for the first mentioned gears, means including a plurality of co-acting gears connecting immovably the driving and driven gears aforesaid when resistance to rotation or rotative force is confined to one of the shaft sections, and movably connecting such driving and driven gears when unequal resistance or oppositely directed rotative forces are simultaneously applied to each axle.

2. Differential mechanism for transmitting power to axially aligned shaft sections comprising two differentially toothed gears of appropriately differing pitch diameters splined on said shaft sections enclosed within a gear case, one or more coaxial gears secured in said case and counter-bored to afford journal bearing for the first mentioned gears, said second mentioned gears having a pitch diameter less than that of one and greater than that of the other but substantially the same as that of either of the axle gears, a plurality of integrally formed gears co-axially journaled in a cage rotative on non-toothed portions of second mentioned gears and intermeshing with said case as well as the axle gears, and means afforded by slight deviations of the respective gear pitch lines from the straight to limit differentiation by permitting the cage to rotate around the axis of the gear case when each axle is subject to a simultaneous and oppositely directed force, but to prevent rotation of said cage when either axle only is subjected to a rotative force.

In testimony whereof, I have hereunto signed my name at Philadelphia, Pennsylvania, this 15th day of September, 1930.

JOSEPH PERCY REMINGTON.